J. W. Wheeler,
Windlass Water Elevator.
No. 1,028. Reissued Aug. 21, 1860.
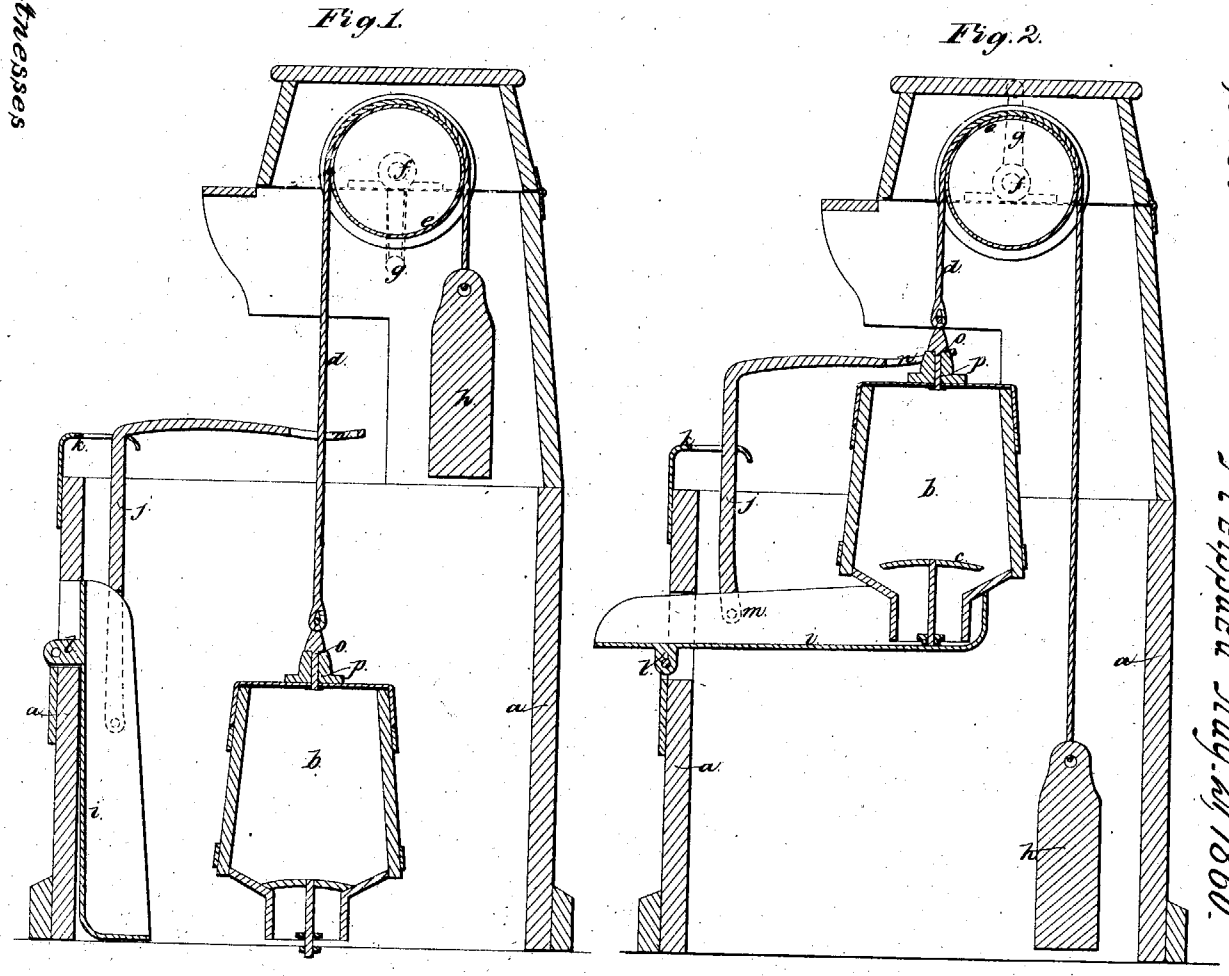
Witnesses
T. T. Everett
G. C. Lamb Knight
Inventor.
John W. Wheeler
N. PETERS, PHOTO-LITHOGRAPHER, WASHINGTON, D. C.

UNITED STATES PATENT OFFICE.

JOHN W. WHEELER, OF CLEVELAND, OHIO.

IMPROVED METHOD OF ELEVATING AND DELIVERING WATER FROM WELLS.

Specification forming part of Letters Patent No. 26,870, dated January 17, 1860; Reissue No. 1,028, dated August 21, 1860.

*To all whom it may concern:*

Be it known that I, JOHN W. WHEELER, of Cleveland, in the county of Cuyahoga and State of Ohio, have invented new and useful Improvements in Means for Drawing and Delivering Water from Wells; and I do hereby declare that the following is a full, clear, and exact description of the same, reference being had to the accompanying drawings, and to the letters marked thereon.

My invention is designed to be used in wells of any depth or diameter, and has been gotten up with the view of elevating and delivering water from the well with safety and certainty, the acts of drawing and delivering being performed simply by turning of a windlass and requiring one hand of the operator.

Of the drawings forming part of this specification, Figure 1 is a view by vertical section of a well-curb, a bucket, and the means for raising the bucket and delivering the water, the valve in the bucket being shown resting on its seat, the bucket being on its downward track; and Fig. 2 is a view, also by vertical section, of a curb, bucket, and the means for drawing and delivering the water, the valve of the bucket being shown elevated from its seat as when the water is passing out from the bucket and being delivered by the trough.

In both of the figures of the drawings like parts are indicated by like letters.

*a* marks the well-curb; *b*, the bucket; *c*, the valve of the bucket; *d*, the rope or chain; *e*, the pulley; *f*, the windlass; *g*, the crank; *h*, the balancing-weight of the bucket; *i*, the trough; *j*, the lever which operates the trough, and *k* the guide to the lever.

The drawings represent a hinged cover to the windlass, which may be used or not, as preferred.

The windlass and pulley are of common construction, with the exception that the groove of the pulley is covered with india-rubber or gutta-percha, this covering being indicated by the blue line. It will be noticed that the rope attached to the bucket is not secured to the pulley, but only passes around it, the friction alone keeping the rope from slipping on the pulley during the rotation of the windlass. The weight *h* is designed to balance the bucket when empty.

The valve shown in the drawings is the beveled disk-valve with a stem projecting downward, and has for its seat an inclined bottom of the bucket, terminating in a tube or cylinder; but other valves may be substituted for this valve, as a flap-valve with a stem, and the bottom of the bucket may be of ordinary construction or be in a curved or dished form instead of an inclined, as represented. It will be perceived that this form of bottom for the bucket allows the bottom of the bucket to enter the water easily without tipping, and giving free escape and full drainage of the bucket both inside and out. It will be seen that the trough is hinged to the curb at *l*, and that the lever is hinged to the trough at *m*. The lever is guided by the bar *k*, secured to the top of the curb, and in its movements plays in the slot of the guide-bar. The lever is slotted at its inner end, *n*, the slot allowing the rope free motion, but being too small to admit more than the stem *o* of the knob *p*, attached to the cross bar or bail of the bucket.

From the construction and arrangement of the means here recited it will be readily perceived that if the parts be in the position shown by Fig. 2, upon the windlass being turned in the proper direction to lower the bucket, the trough will recede from the bucket and pass to the position shown by Fig. 1, and the rope will pass through the slot of the lever *j*. The bucket, on reaching the water, will easily become filled, the valve opening upward by the pressure of the water. The bucket being filled and the windlass being turned so as to elevate the bucket brings the stem of the knob against the sides of the slot of the lever *j*, raising the lever and carrying with it the trough, the rear and widened bottom of the trough hitting the stem of the valve, and thus opening the valve and allowing the water free escape to a vessel outside of the curb.

The relation of the fulcrum *m* of the lever *j* and that, *l*, of the trough *i* it will be perceived, is such that the rear end of the trough is moved upward with a greater degree of rapidity than the bucket, and that thus ample provision is made for the full and rapid opening of the valve.

Having thus set out my invention, what I claim as new, and desire to secure by Letters Patent, is—

1. Operating the valve in the bottom of the bucket by the rear end of the trough, the lever actuating the trough being moved by the bucket, and the trough having a more rapid advance than the bucket, as herein set forth.

2. In combination with the above, the employment of a grooved pulley and weight to operate the bucket, having a strip of india-rubber fastened in the groove of said pulley, in the manner and for the purpose set forth.

JOHN W. WHEELER.

Witnesses:
W. H. BURRIDGE,
HENRY VOTH.